United States Patent [19]
DeAngelis

[11] 3,781,003
[45] Dec. 25, 1973

[54] HANDLING GLASS-PLASTIC ASSEMBLIES
[75] Inventor: Willie G. DeAngelis, Brackenridge, Pa.
[73] Assignee: PPG Industries, Inc., Pittsburgh, Pa.
[22] Filed: May 12, 1972
[21] Appl. No.: 252,797

[52] U.S. Cl. .................. 269/40, 156/105, 156/598, 211/41, 269/43
[51] Int. Cl. ......................... B25b 1/20, B32b 31/26
[58] Field of Search ....................... 269/154, 40, 43; 156/99, 105, 598; 211/41

[56] References Cited
UNITED STATES PATENTS

| 1,883,375 | 10/1932 | Hilliard | 211/41 X |
| 2,303,151 | 11/1942 | Watkins et al. | 156/105 X |
| 2,504,726 | 4/1950 | Philippi | 211/41 X |
| 2,865,513 | 12/1958 | Allen | 211/41 |
| 2,946,453 | 7/1960 | Pityo | 211/41 |
| 3,101,027 | 8/1963 | Brogan | 269/43 X |
| 3,281,297 | 10/1966 | Schmidt | 156/106 |
| 3,508,996 | 4/1970 | Hill | 156/382 |
| 3,675,299 | 7/1972 | Sherrill | 269/43 |

Primary Examiner—Donald G. Kelly
Assistant Examiner—Joseph T. Zatarga
Attorney—Russell A. Eberly

[57] ABSTRACT

Apparatus for supporting a plurality of glass-plastic assemblies for lamination in an autoclave comprising bottom edge support structure including aligned bottom edge spacing elements, flexibly interconnected top edge engaging and spacing elements, and structure for making rigid the flexible interconnecting elements on which the top edge engaging and spacing elements are mounted.

7 Claims, 5 Drawing Figures

PATENTED DEC 25 1973

HANDLING GLASS-PLASTIC ASSEMBLIES

BACKGROUND OF THE INVENTION

1. Field of the Invention

The present invention relates to handling glass-plastic assemblies during lamination. Glass-plastic laminates are used as curved one-piece windows in automobiles, aircraft and other vehicles. In addition, flat laminates of glass and plastic are used as burglar proof windows in certain installations.

It is customary in the fabrication of curved laminated windows to bend a pair of glass sheets simultaneously while the glass sheets are mounted on a bending mold of the outline type with a parting material inserted between the glass sheets. The glass laden molds are conveyed through a bending lehr where they are exposed to heat to soften the glass sheets so that they sag to conform to the shape of the bending molds.

A typical lehr for bending glass sheets in pairs is disclosed and claimed in U. S. Pat. No. 2,794,300 to James S. Golightly and a method of applying a suitable parting material of a finely divided diatomaceous earth that need not be removed after bending the glass sheet pair is disclosed in U. S. Pat. No. 2,725,320 to Florian V. Atkeson and James S. Golightly. A typical mold of the sectionalized, outline type for bending glass sheets in pairs is disclosed and claimed in U. S. Pat. No. 2,933,856 to Walter W. Barcikowski and Chester W. Sabotka.

Each pair of glass sheets with the parting material of diatomaceous earth of the aforesaid U. S. Pat. No. 2,725,320 disposed between the glass sheets is heated while conveyed through the bending lehr of U. S. Pat. No. 2,794,300 until the glass sheets conform to the shape of the mold. The bent glass sheets are removed from the mold, separated from one another and reassembled with a sheet of suitable plastic material such as polyvinyl butyral inserted therebetween. The assembly is then subjected to a preliminary pressing either by heating the assembly and passing the assembly between pairs of nippr rolls such as disclosed in U. S. Pat. No. 3,351,001 to Anthony A. Aachio or by enclosing the periphery of the assembly and the margin only of the assembly with a flexible channel-shaped member made of a fluid impervious material in spaced relation to at least part of the periphery of the assembly to provide an evacuation conduit adjacent the periphery of the interfaces between the interlayer and the glass sheets of the assembly as provided in U. S. Pat. No. 2,948,645 to Laurence W. Keim.

The preliminarily pressed assemblies are ready for final pressing in an oil autoclave. A typical prior art autoclave is disclosed in U. S. Pat. No. 1,870,693 to James H. Sherts.

In order to improve the efficiency of the autoclave operation, autoclaves have been increased in size, particularly in height compared to the autoclave depicted in the aforesaid U. S. Pat. No. 1,870,693. In fact, it has become customary to stack four or five racks, each containing many assemblies arranged in an upright orientation with the assemblies arranged as closely as possible to one another with sufficient space between adjacent assemblies to permit hot pressurized oil within the autoclave to apply fluid pressure throughout the extent of the autoclave to laminate the glass and plastic plies of the assemblies to one another to convert translucent assemblies into transparent laminated windows.

In the past, the assemblies were arranged on racks in the autoclave with their bottom edges resting on a pair of horizontally extending beams extending in chordal relationship across the bottom of a cylindrically shaped open rack. Each assembly was separated from adjacent assemblies by a pair of vertical pins, each with its bottom edge pivotally mounted in a socket connection along one or the other beam. The pins of prior art apparatus were longer than the height of the assemblies to be laminated.

In the past and prior to the present invention, the racks provided with such pairs of pins were successfully used to store from 22 to 26 assemblies on each rack for lamination, depending on the shape of the windshield to be laminated. Windshields laminated from assemblies comprising two glass sheets, each having a nominal thickness of ⅛ inch and a plastic interlayer having a nominal thickness of 0.030 inch, were laminated successfully for several years.

Recently, safer windwhields were developed with thinner glass sheets in which each glass sheet was less than 0.100 mils thick. An attempt to modify the assembly storage racks to increase the capacity of each rack by replacing the previously used pins with thinner pins resulted in a new type of optical defect called "pin distortion." This distortion results from an elongated crimp in the glass that extends completely across the windshield in the locations where the elongated pins engaged the assemblies during lamination. In an installed windshield, these distortion lines are located directly in front of either the driver or the passenger or both and are very annoying to an occupant of the vehicle.

DESCRIPTION OF THE PRIOR ART

The following patents show various apparatus for handling glass-plastic assemblies to be laminated: U. S. Pat. No. 1,870,693 to James H. Sherts; U. S. Pat. No. 1,960,580 to Frank Fraser; U. S. Pat. No. 1,965,113 to John L. Drake; U. S. Pat. No. 2,355,696 to Floyd E. Bartell; U. S. Pat. No. 3,281,297 to Richard P. Schmidt and U. S. Pat. No. 3,508,996 to Dale H. Hill. In addition, the following patents relate to glass sheet handling equipment: U. S. Pat. No. 2,685,374 to Edward L. Croston; U. S. Pat. No. 2,838,898 to William Owen; U. S. Pat. No. 3,616,938 to Kenneth McAleenan, John B. Pendergrast, Jr., William D. Woods, Stanley Pitt and Howard W. La Morte.

SUMMARY OF THE INVENTION

The present invention has made it possible to laminate safer windshields comprising thinner glass sheets than previously while avoiding "pin distortion." At the same time, the present invention makes it possible to increase the capacity of each rack used in an autoclave from a range of 22 to 26 assemblies using racks that caused "pin distortion" to a range of 42 to 52 assemblies per storage rack using the rack as modified according to the teachings of the present invention. The number of assemblies stored depends on the size and depth of bend of the assemblies to be laminated.

The apparatus for supporting glass-plastic assemblies for lamination in an autoclave according to a preferred embodiment of the present invention comprises a rack including a pair of horizontally extending support beams for supporting each of said assemblies along their lower edges. Each of said beams is provided with longitudinally spaced vertically extending spacing means separated from one another along each of said support beams by a distance approximating but slightly more than the thickness of said assemblies to be supported. Means is provided for engaging and separating the upper edges of adjacent of said assemblies. The upper edge engaging means are flexibly interconnected to one another by a flexible interconnecting means to facilitate loading a rack. Means is provided to make rigid said flexible means whereby said upper edge engaging and separating means are rigidly supported in spaced relation between the top edges of adjacent of said assemblies within said rack to support said assemblies in upright position after said assemblies are loaded in the rack.

Preferably, the bottom edge spacing means are dowels aligned with one another and alternately colored and the upper edge engaging and separating means are hollowed out to minimize their mass and to provide space for receiving a pigtail connection for an antenna windshield. Preferably, the top edge engaging and separating means have enlarged base portions mounted to alternate links of a flexible chain and the means to make the flexible chain rigid is either a tensioning means attached between the chain and a portion of the rack in fixed position relative to the horizontally extending support beams or a locking means extending through aligned apertures extending parallel to the length of the chain through abutting base portions that support said top edge engaging and separating means.

BRIEF DESCRIPTION OF THE DRAWINGS

A preferred embodiment illustrating the present invention will be described in order to help the reader understand more clearly the subject matter of the present invention.

In the drawings that form part of the description and wherein like reference numbers refer to like structural elements.

DESCRIPTION OF A PREFERRED EMBODIMENT

Figure 1:
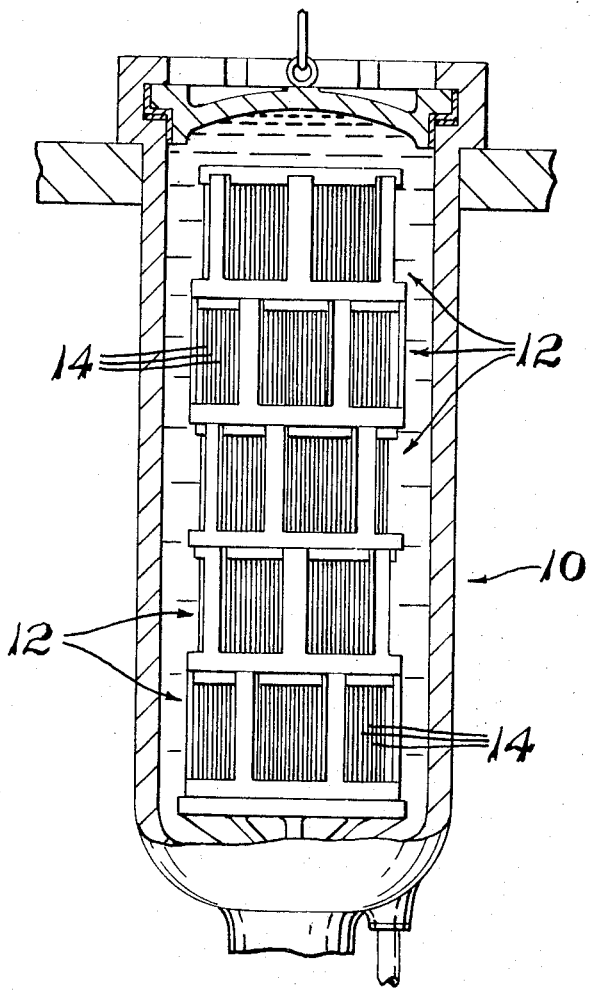
FIG. 1 is a vertical sectional view of a typical autoclave apparatus showing a stack of five racks mounted for a laminating operation.
Figure 5:
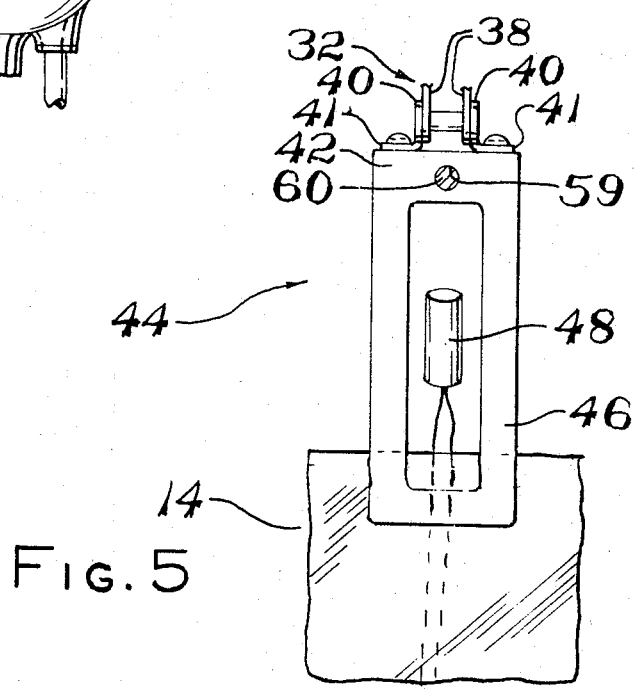
FIG. 5 is an enlarged fragmentary view of one of the upper glass edge engaging means and its attached chain links taken along the lines 5—5 of FIG. 4, showing how it is hollowed out to receive a pig-tail connection for a laminated antenna windshield.

Referring to the drawings, FIG. 1 shows an autoclave 10 with a series of racks 12 mounted in stacked relation for final lamination. Each rack 12 is loaded with a plurality of glass-plastic assemblies 14 mounted in a manner taught by the present invention and disclosed in greater detail in the other figures.

Figure 2:
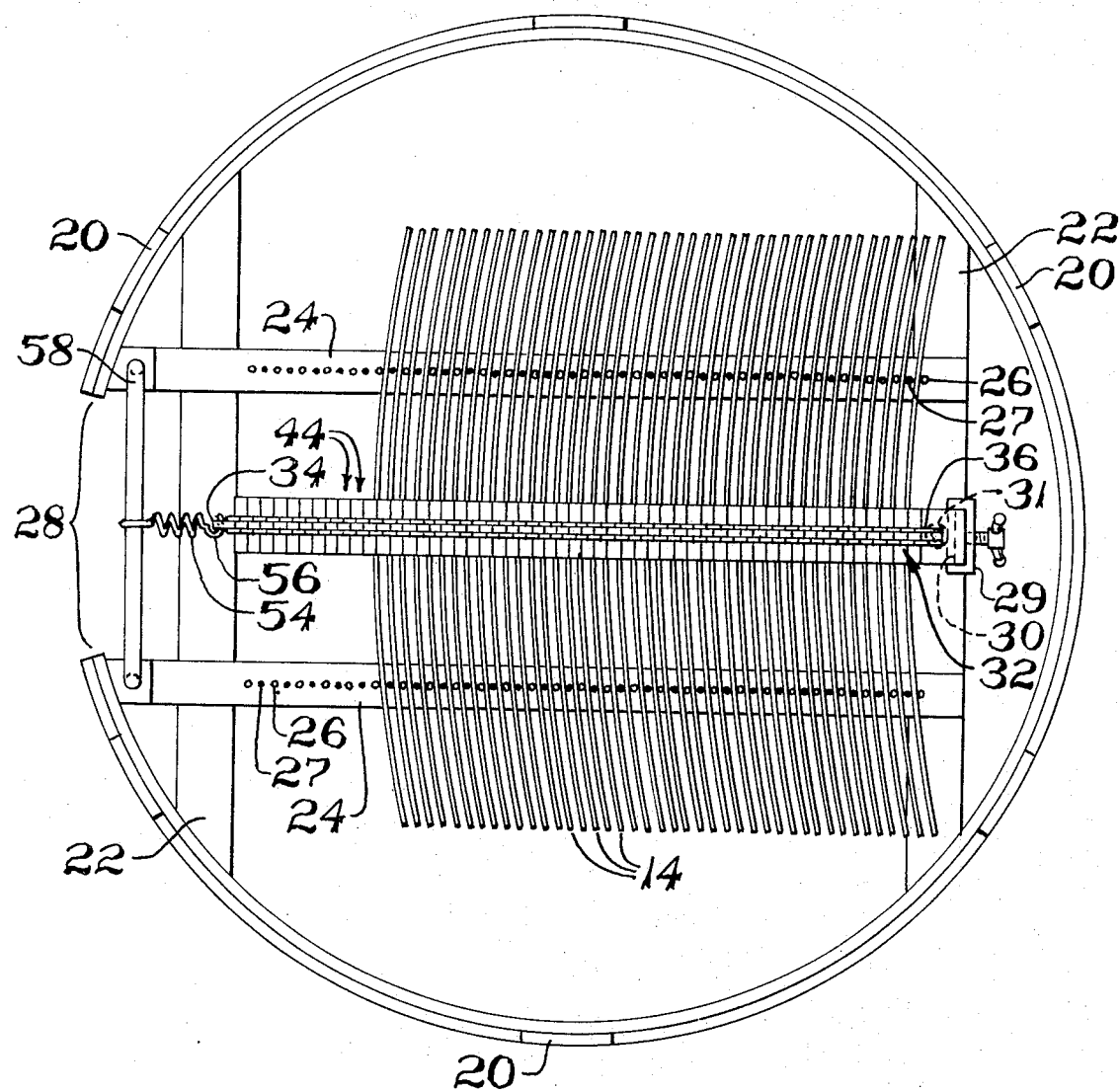
FIG. 2 is a plan view of one of the racks depicted in FIG. 1 with glass-plastic assemblies mounted on said rack for lamination in an autoclave.
Figure 3:
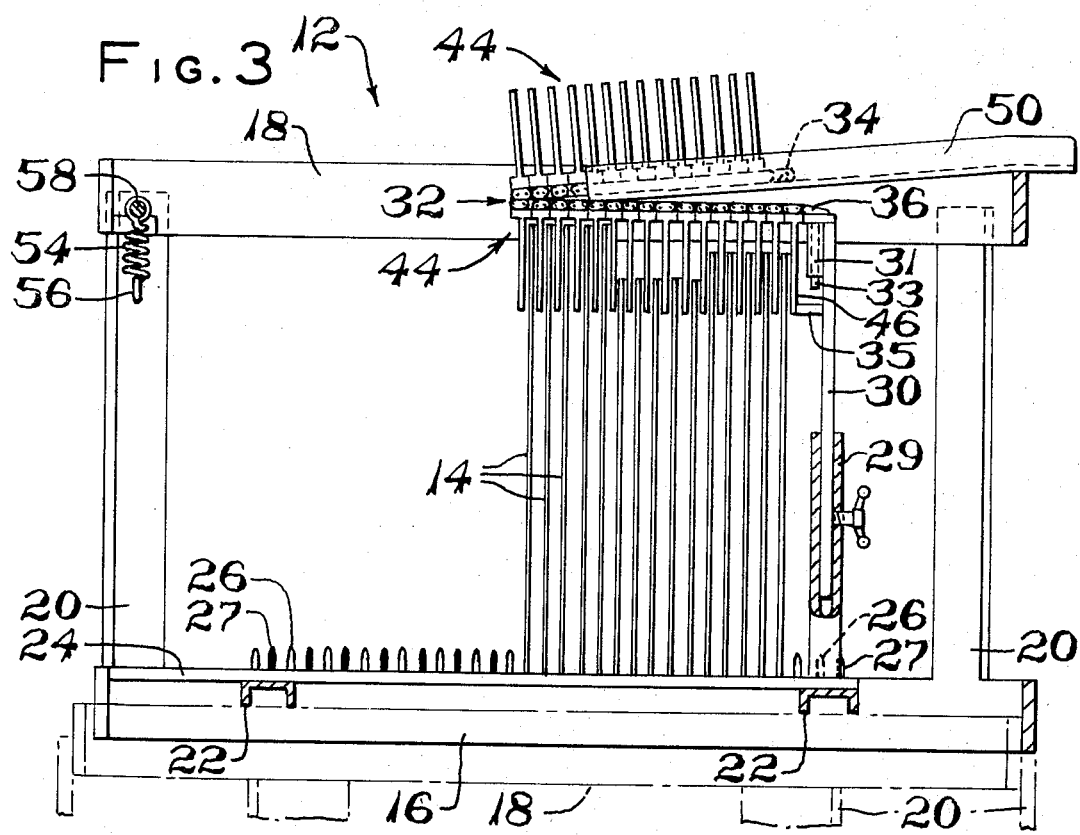
FIG. 3 is a view taken at right angles to that of FIG. 2 showing an autoclave rack partially loaded.
Figure 4:
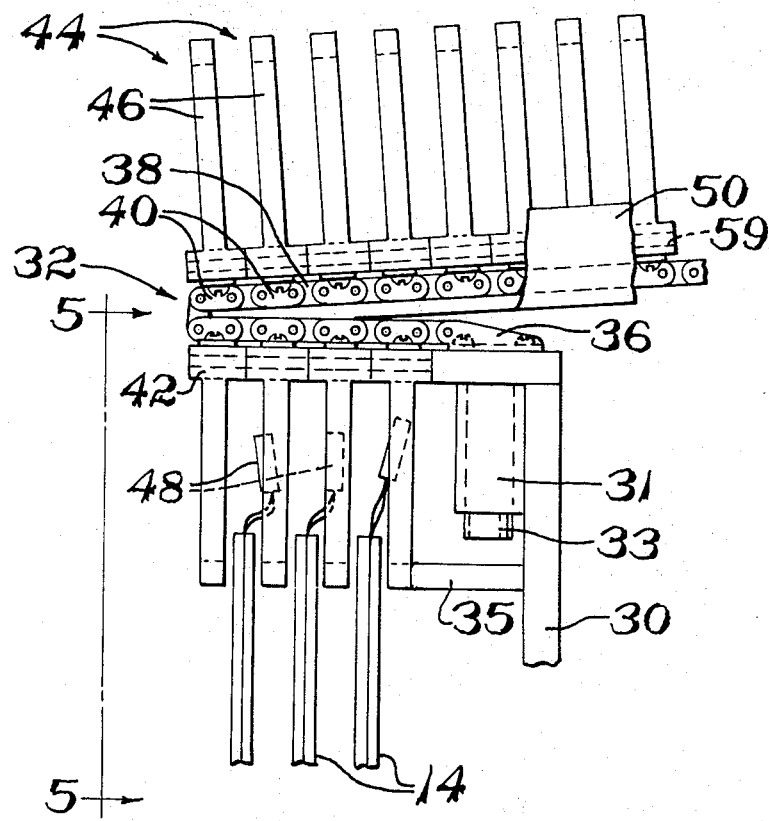
FIG. 4 is an enlarged view of a portion of the upper glass edge engaging means to show its structure in greater detail.

As seen more clearly in FIGS. 2 and 3, each rack 12 is of open cylindrical shape and comprises a lower open ring member 16 and an upper open ring member 18 interconnected by circumferentially spaced vertical connectors 20. The lower ring member 18 is constructed and arranged to nest over the upper ring member 16 of a rack 12 on which another rack is superimposed. (FIG. 3) Clamps (not shown) are also arranged in peripherally spaced relation (45 degrees apart) to help secure adjacent racks in superimposed relation.

Inverted channel shaped cross members 22 extend in parallel chordal relation between different parts of the lower ring member 16 in a common horizontal plane. The cross members 22 support a pair of horizontally extending support beams 24 that are arranged normal to the length of the cross members 22.

The support beams 24 are preferably white pine slabs 1 inch thick and 1½ inches wide. Each beam 24 supports a row of aligned dowels 26 and 27 equally spaced along the length of each beam with alternate dowels 26 of one color and other alternate dowels 27 of a different color. Alternating the color of the dowels facilitates an operator to load each rack 12 to its optimum capcity by insuring that aligned dowels 26 or 27 are used as guides for inserting the selected bottom edges of prepressed assemblies in the proper space between aligned dowels 26 and 27 on each beam 24.

The upper ring member 18 and the lower ring member 16 do not extend completely around the circumference. An opening 28 is provided in the rack by discontinuing the upper ring member 18 and the lower ring member 16 to provide vertically aligned spaces to enable an operator to enter the rack 12 to load the latter with glass-plastic assemblies 14 before a laminating operation or to unload the assemblies after the operation. In order to have the stack of racks provide adequate structural rigidity completely around the circumference of the stack, each rack is mounted at an orientation offset angularly from the orientation of adjacent racks so that only one or at most two racks in a stack have their open-ended portions in part or full vertical alignment with one another.

An upright 29, which surrounds the lower part of a vertically adjustable support 30, extends vertically from one of the cross members 22. The adjustable support 30 has a pipe 31 at its uppermost portion. A chain 32 having a pin 33 at one end and an eye 34 at its free end is attached to the adjustable support 30 by inserting the pin 33 in pipe 31. The adjustable support 30 also includes a stop member 35 that extends horizontally from the upright support toward the opening 28 along a diameter of the cylindrically shaped rack 12. The upper surfaces of the horizontally extending beams 24 are below the upper end of pipe 31 by a vertical distance that is slightly greater than the height of the widest windshield assembly to be laminated while supported in the rack 12. Pin 33 is carried by the first link 36 of chain 32.

Chain 32 is a rollerless type chain similar to a bicycle chain and comprises alternating centrally disposed inner double walled links 38 and double walled outer links 40 pivoted to one another in end-to-end relation and terminating with an end link that carries the eye 34 at the free end of chain 32.

Each double walled outer link 40 of chain 32 is provided with apertured flanges 41 for attachment to a relatively wide base portion 42 of an upper edge engaging and separating member 44. The latter comprises a relatively narrow apertured stem member 46 extending from the center of the base portion 42 in a direction away from chain 32. The base members 42 are arranged to abut one another when the chain 32 is extended is a straight line. At the same time, spaces are provided between adjacent stem members 46 to receive the upper edge portion of an assembly 14 therebetween to help support the assembly in an upright position.

The stem member 46 is apertured to receive a so-called "pig-tail" connector 48 for an antenna carried by the interlayer of a windshield assembly 14 in case the windshield to be laminated is a combination windshield and antenna of the type that has become popular lately. Another reason for aperturing the stem member 44 of the upper edge engaging and separating means 46 is to minimize the mass of the upper edge engaging means that engages the heated assembly during the autoclave cycle of high temperature and pressure.

In a typical embodiment for supporting glass-plastic assemblies comprising two glass sheets each approximately 0.090 inch thick and one plastic sheet approximately 0.030 inch thick, the dowels 26 and 27 comprising the bottom edge spacing means are ⅜ inch diameter dowels mounted on ¾ inch center to center spacing. Each dowel is ½ inch to ⅝ inch high and has a pointed top. All the dowels are composed of hard wood with dowels 26 of natural color and dowels 27 painted black. Each dowel 26 and 27 supported by one beam 24 is aligned with a corresponding dowel 26 or 27 supported by the other beam 24.

Each pair of adjacent links 38 and 40 has an effective length of ¾ inch. Each base portion 42 attached to the flanges 41 extending laterally outward of alternate links 40 is of rectangular shape in plan and has a thickness of ¾ inch in the direction of the length of chain 32 and a width of approximately 1-¼ inches. The apertured stem member 46 is approximately ⅜ inch thick, 4-½ inches long and 1-¼ inches wide and is made of aluminum with flat surface. The length of members 46 is sufficient to accommodate the range of different windshield heights of patterns contemplated for processing. The recessed thickness of the stem portions 46 provides a space between adjacent stem portions of sufficient thickness to receive the upper edge of an assembly 14. Since the thickness of the spaces between adjacent stem portions is greater than the thickness of the assemblies processed, the upper edges of the assemblies contact one or the other of adjacent stem portions.

Each prepressed glass-plastic assembly is supported on its bottom edge on the horizontally extending beams 24 between adjacent dowels 26 and 27. The stem members 46 are disposed between the upper edge portions of adjacent assemblies 14 and are centrally disposed of the assemblies and in a vertical plane disposed intermediate the vertical planes that intersect the rows of dowels 26, 27 carried by the horizontally extending support beams 24. Thus, each aligned pair of dowels serves as a bottom edge spacing means whereas the stem portions 46 serve as upper edge engaging and separating means.

In order to load a rack 12, the chain 32 is mounted with its end link 36 resting on vertically adjustable support 30 with pin 33 inserted in pipe 31 and the apertured stem member 46 of the first upper edge separating member 44 resting against the inner end of stop member 35. A prepressed curved glass-plastic assembly 14 is carried by an operator through the opening 28 and deposited with a chosen longitudinal side edge of the assembly (preferably the edge opposite that containing the "pig-tail" connection in case of an antenna windshield) resting on the beams 24 between corresponding dowels 26 and 27. A channel shaped member 50 supported in a cantilever arrangement extending radially inwardly from the upper ring member 18 initially supports the remaining links of chain 32 in upside down position with stem members 46 pointed upward. After the first assembly 14 is properly mounted on beams 24 with one major surface against the radially inner surface of stem member 46, a pair of adjacent links 38 and 40 is flopped over from a position in which the upper edge engaging and separating members 44 are oriented with the apertured stem members 46 extending upward to a position in which the next apertured stem member 46 attached to the chain 32 faces downward radially inward of the upper edge of the first glass-plastic assembly with its aperture receiving the "pig-tail" if present, thus preparing the rack to receive the next assembly to be mounted for laminating.

A second assembly is loaded with its selected bottom edge resting on beams 24 in the next corresponding spaces between adjacent dowels 27 and 26. The next pair of adjacent links 38 and 40 is flopped over to place the next upper edge engaging and separating member 44 radially inward of the upper edge of the second assembly 14. The process is repeated until the rack is filled.

In case the assembly to be laminated does not fit within the end portion of the rack, it may be necessary to flop over two or more of the top edge engaging and separating members 44 before loading the first assembly in the rack. The remaining steps are repeated until the rack is filled to capacity as heretofore described.

Means is provided to tension the chain 32 and its connected upper edge engaging and separating members 44. The tensioning means comprises a spring 54 carrying a springloaded hook 56 at its free end and connected to a removable cross bar 58 extending chordlike between the ends of the upper discontinuous ring member 18 across the opening 28. When the rack is filled with assemblies, the removable cross bar 58 is replaced and the spring-loaded hook 56 engages the eye 34 at the free end of chain 32. The channel member 50 is removed and the loaded rack is ready to be stacked with additional racks in an autoclave. The tensioning means prevents the chain from bending away from its desired straight line configuration and comprises means for imparting rigidity to the chain 32, which serves as a flexible connecting means for the upper edge separating and engaging members 44.

An alternative means to impart rigidity to the chain 32 is to provide each base portion 42 with an aperture 59 extending parallel to the length of the chain. When the rack is loaded and the base portions 42 abut, the apertures are aligned and an alignment pin 60 may be inserted through the aligned apertures of the abutting base portions 42 as a locking means to impart rigidity to the chain 32. Of course, both a locking means and a tensioning means may be used to impart rigidity to the flexible connecting means or chain 32.

After the rack 12 is loaded as described previously, it is stacked with additional loaded racks and the stack of racks inserted in an autoclave where the glass-plastic assemblies are subjected to an elevated temperature (approximately 275° F.) and an elevated pressure (approximately 200 pounds per square inch) for sufficient time (30 to 45 minutes) to produce transparent laminates. After the assemblies are laminated, the racks are removed from the autoclave and unstacked.

Each rack is unloaded by first removing the removable cross bar 58 and then removing the means to impart rigidity to the flexible connecting means or chain 32. Then, each upper edge engaging and separating member 44 is pivoted one at a time until one disengages from the upper edge of a laminated assembly. The latter is then removed from the rack and the next upper edge engaging and separating member 44 pivoted away from the next laminated assembly, thereby making the latter available for removal. The process continues until the entire rack is unloaded.

The form of the invention shown and described in this disclosure represents an illustrative preferred embodiment and certain modifications thereof. It is understood that various changes may be made without departing from the gist of the invention as defined by the claimed subject matter that follows.

I claim:

1. Apparatus for supporting glass-plastic assemblies for lamination in an autoclave comprising a rack for supporting a plurality of said assemblies in an upright position, said rack comprising support means extending horizontally for supporting each of said glass-plastic assemblies along a longitudinal side edge, said support means being provided with longitudinally spaced vertically extending bottom edge spacing means separated from one another along said support means by a distance approximating, but slightly more than the thickness of said assemblies to be supported, means for separating adjacent of said assemblies by engaging the upper edge of at least one of each pair of adjacent of said assemblies, flexible interconnecting means for interconnecting said upper edge separating and engaging means to one another, and means adapted to be coupled to said flexible interconnecting means in such a manner to impart rigidity to said flexible interconnecting means when coupled thereto.

2. Apparatus as in claim 1, wherein said means to impart rigidity comprises tensioning means adapted to be secured to one end of said flexible interconnecting means whereby said means for engaging the upper edges of said assemblies are supported in spaced relation between the top edges of adjacent of said assemblies within said rack to support said assemblies in upright position with the bottom edges of said assembly resting on said horizontally extending support beams.

3. Apparatus as in claim 1, wherein said means to impart rigidity comprises locking means.

4. Apparatus as in claim 1, wherein said horizontally extending support means comprises a pair of parallel beams having their upper surfaces in a common horizontal plane and said bottom edge spacing means comprises a plurality of vertically extending spacing members longitudinally spaced along the length of each of said beams, a spacing member for each beam being aligned with a corresponding spacing member for the other beam.

5. Apparatus as in claim 4, wherein each spacing member along the length of each of said beams has a different color from that of each spacing member adjacent thereto and the same color as said corresponding spacing member for the other beam of said pair of beams.

6. Apparatus as in claim 1, wherein said flexible interconnecting means comprises a chain and said upper edge separating and engaging means comprises a base portion attached to alternate links of said chain and a stem member extending from said base portion in a direction away from said chain, each said base portion having a thickness in the direction of the length of said chain sufficient for adjacent base portions to abut when said chain is straight and each said stem member being sufficiently thinner than said base portion in the direction of the length of said chain to provide a space between adjacent stem members sufficient to receive the upper edge portion of one of said assemblies therebetween.

7. Apparatus as in claim 6, wherein said base portions are apertured in a direction parallel to the length of said chain to provide aligned apertures adapted to receive a locking pin when said chain is straight.

* * * * *

UNITED STATES PATENT OFFICE
CERTIFICATE OF CORRECTION

Patent No. 3,781,003          Dated December 25, 1973

Inventor(s) Willie G. DeAngelis

It is certified that error appears in the above-identified patent and that said Letters Patent are hereby corrected as shown below:

Column 2, line 20, "windwhields" should be --windshields--.

Column 4, line 1, "18" should be --16--.
         line 2, "16" should be --18--.
         line 19, "capcity" should be --capacity--.

Column 7, Claim 1, line 35, "separting" should be --separating--.

Signed and sealed this 21st day of May 1974.

(SEAL)
Attest:

EDWARD M. FLETCHER, JR.         C. MARSHALL DANN
Attesting Officer               Commissioner of Patents